US008927138B2

(12) United States Patent
Heo

(10) Patent No.: US 8,927,138 B2
(45) Date of Patent: Jan. 6, 2015

(54) BATTERY PACK HAVING IMPROVED WELDING EFFICIENCY

(75) Inventor: Sangdo Heo, Yongin-si (KR)

(73) Assignee: Samsung SDI Co., Ltd., Gongse-dong, Giheung-gu, Yongin-si, Gyeonggi-do (KR)

(*) Notice: Subject to any disclaimer, the term of this patent is extended or adjusted under 35 U.S.C. 154(b) by 793 days.

(21) Appl. No.: 13/077,016

(22) Filed: Mar. 31, 2011

(65) Prior Publication Data

US 2011/0287284 A1 Nov. 24, 2011

(30) Foreign Application Priority Data

May 24, 2010 (KR) .............................. 2010-0047961

(51) Int. Cl.
*H01M 2/26* (2006.01)
*H01M 4/70* (2006.01)
*H01M 2/22* (2006.01)
*H01M 10/42* (2006.01)
*H01M 2/10* (2006.01)
*H01M 2/02* (2006.01)
*H01M 10/04* (2006.01)

(52) U.S. Cl.
CPC ....... *H01M 2/26* (2013.01); *H01M 4/70* (2013.01); *H01M 2/22* (2013.01); *H01M 2/0217* (2013.01); *H01M 10/425* (2013.01); *H01M 10/04* (2013.01); *H01M 2/1094* (2013.01)
USPC ......................................................... 429/161

(58) Field of Classification Search
CPC .............................................. H01M 2/26–2/266
USPC .......................................................... 429/161
See application file for complete search history.

(56) References Cited

U.S. PATENT DOCUMENTS

2004/0126650 A1* 7/2004 Kim .................................. 429/61
2009/0111004 A1* 4/2009 Jang et al. ......................... 429/61
2009/0155684 A1 6/2009 Jang et al.

(Continued)

FOREIGN PATENT DOCUMENTS

JP 10214614 A * 8/1998
JP 2000100415 4/2000

(Continued)

OTHER PUBLICATIONS

Korean Office Action issued by KIPO on Aug. 26, 2011 in connection with Korean Patent Application No. 10-2010-0047961 and Request for Entry of the Accompanying Office Action attached herewith.

*Primary Examiner* — Barbara Gilliam
*Assistant Examiner* — Robert S Carrico
(74) *Attorney, Agent, or Firm* — Robert E. Bushnell, Esq.

(57) ABSTRACT

A battery pack which can improve welding efficiency of a lead plate by performing welding in a state in which the lead plate is in close contact with a bare cell, and can prevent leakage of an electrolyte by preventing welding failure of the lead plate. The battery pack includes a bare cell having an electrode terminal protruding on a first surface of the bare cell, a circuit module disposed on the first surface of the bare cell, and a first lead plate coupled to one side of the circuit module and connected to the first surface of the bare cell. The first lead plate includes at least one bent portion, and a first notch recess is formed in the at least one bent portion.

13 Claims, 6 Drawing Sheets

(56) References Cited

U.S. PATENT DOCUMENTS

| | | | |
|---|---|---|---|
| 2009/0208825 A1* | 8/2009 | Lee ................................ | 429/94 |
| 2010/0098973 A1 | 4/2010 | Lee et al. | |
| 2010/0233519 A1* | 9/2010 | Cheon et al. .................... | 429/56 |
| 2011/0045322 A1 | 2/2011 | Baek et al. | |
| 2011/0086264 A1* | 4/2011 | Tsukamoto et al. .......... | 429/184 |

FOREIGN PATENT DOCUMENTS

| | | |
|---|---|---|
| KR | 1020090043381 A | 5/2009 |
| KR | 1020090062540 | 6/2009 |
| KR | 1020090064089 A | 6/2009 |
| KR | 1020090103428 | 10/2009 |

* cited by examiner

BATTERY PACK HAVING IMPROVED WELDING EFFICIENCY

CLAIM OF PRIORITY

This application makes, reference to, incorporates into this specification the entire contents of, and claims all benefits accruing under 35 U.S.C. §119 from an application earlier filed in the Korean Intellectual Property Office filed on May 24, 2010 and there duly assigned Serial No. 10-2010-0047961.

BACKGROUND OF THE INVENTION

1. Field of the Invention

The present invention relates to a battery pack.

2. Description of the Related Art

A lithium secondary battery may be made into a battery pack.

SUMMARY OF THE INVENTION

It is therefore an object of the present invention to provide an improved battery pack.

It is another object of the present invention to provide a battery pack which can improve a welding efficiency of a lead plate by performing welding in a state in which the lead plate is in close contact with a bare cell.

It is still another object of the present invention to provide a battery pack which can prevent leakage of an electrolyte by preventing a welding failure of the lead plate.

Additional advantages, objects and features of the invention will be set forth in part in the description which follows and in part will become apparent to those having ordinary skill in the art upon examination of the following or may be learned from practice of the invention.

According to one aspect of the present invention, a battery pack may be constructed with a bare cell having an electrode terminal protruding on a first surface of the bare cell, a circuit module disposed on the first surface of the bare cell, and a first lead plate coupled to one side of the circuit module and connected to the first surface of the bare cell. The first lead plate may include at least one bent portion, and a first notch recess may be formed in the at least one bent portion.

The first lead plate may include a first lead bottom wall contacting a bottom surface of the circuit module, a first lead side wall bent and extending from the first lead bottom wall, and a first lead extension bent and extending from the first lead side wall so as to contact the first surface of the bare cell. The first lead extension is parallel to the first lead bottom wall. The first notch recess is formed at an edge where the first lead side wall and the first lead extension meet.

The first lead plate may face the first surface of the bare cell.

The first notch recess may have a depth within a range of approximately 10% to approximately 50% of a thickness of the first lead plate.

The first lead plate may have a substantially "Z" shape.

The first lead plate may be an electrode tab that electrically connects the bare cell and the circuit module to each other.

The first lead extension may be welded to the first surface of the bare cell by laser welding.

The first lead plate may be made of a metal.

The first surface of the bare cell may be formed of a cap plate made of a metal.

According to another aspect of the present invention, the battery pack may further include a second lead plate coupled to the opposite side of the circuit module and connected to the first surface of the bare cell.

The second lead plate may be formed to be symmetrical with the first lead plate with respect to the electrode terminal in view of location and shape.

The battery pack may further include a top cover covering the circuit module.

The first lead side wall may include a first section bent and extending from the first lead bottom wall, and a second section bent and extending from the first section and connected to the first lead extension. The first notch recess may be further formed at an edge where the first section and the second section meet.

The first notch recess formed at the edge where the first section and the second section meet may face the first lead extension.

As described above, since the battery pack constructed as the embodiments according to the principles of the present invention includes a lead plate having a notch recess formed therein, laser welding may be performed on the lead plate in a state in which the lead plate is in close contact with a top surface of the bare cell.

Therefore, in the battery pack constructed as the embodiments according to the principles of the present invention, welding efficiency of the lead plate can be improved. Further, welding failure of the lead plate can be prevented, thereby preventing leakage of an electrolyte.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Generally, a battery pack may include a bare cell having an electrode assembly with a positive electrode plate, a negative electrode plate, and a separator, a can accommodating the electrode assembly, and a cap assembly sealing an upper opening of the can, a circuit module having a circuit device, such as a charge/discharge device and a protection circuit device, and disposed at an upper portion of the bare cell, a lead plate electrically connecting the bare cell to the circuit module, and an outer cover covering the circuit module.

The lead plate is coupled to the bare cell by, for example, a welding process. The welding process has, however, conventionally been performed in a state in which the lead plate is not in close contact with the bare cell. In such a state, a welding efficiency may be poor, undesirably resulting in welding failures of the lead plate.

Example embodiments will now be described more fully hereinafter with reference to the accompanying drawings.

Figure 1A:
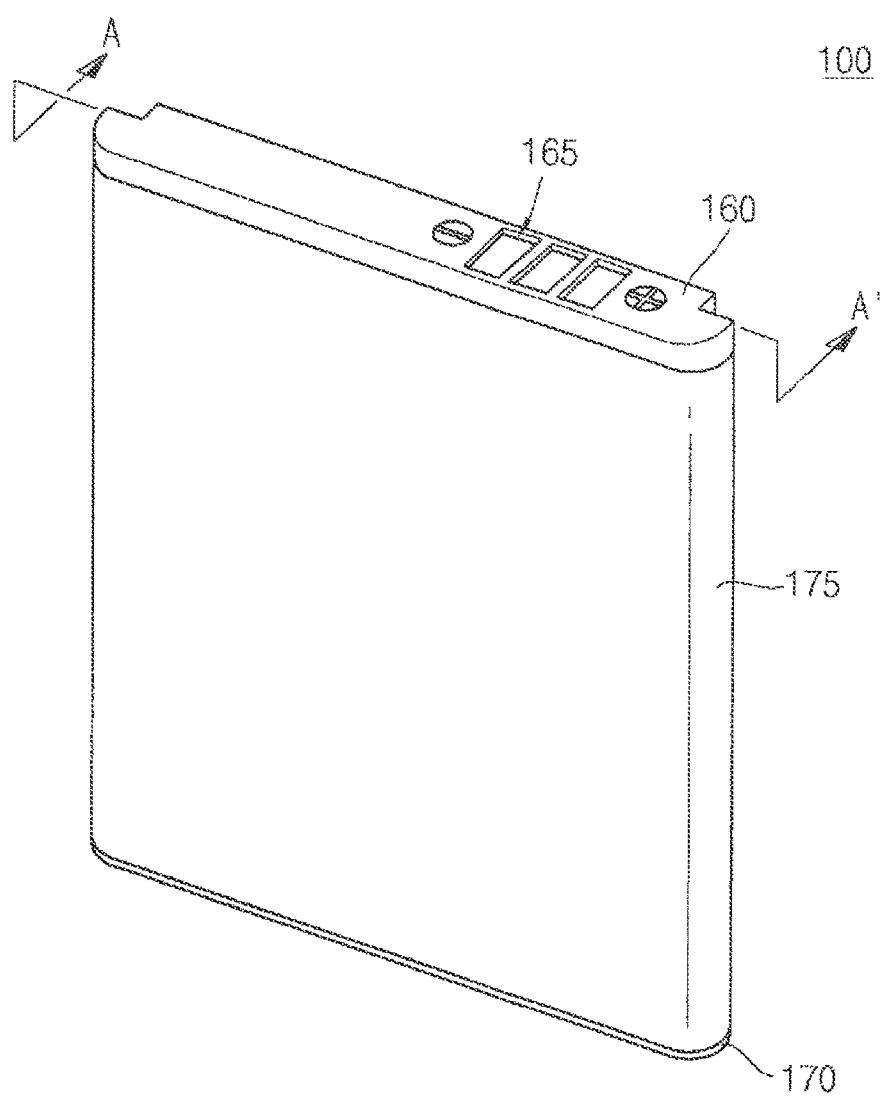
FIG. 1A is an oblique view of a completed battery pack constructed as an embodiment according to the principles of the present invention.
Figure 1B:
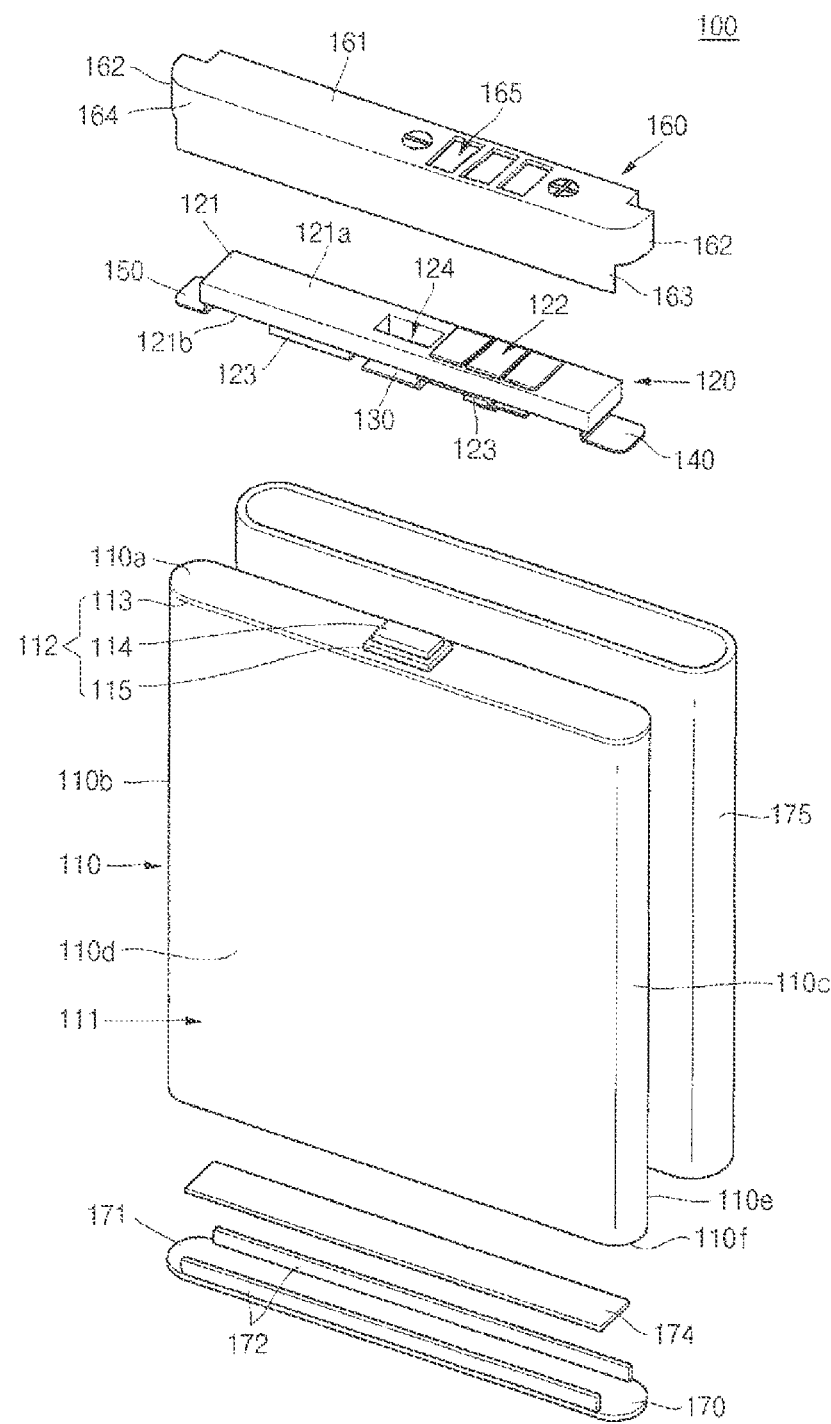
FIG. 1B is an exploded oblique view of the battery pack shown in FIG. 1A.
Figure 1C:
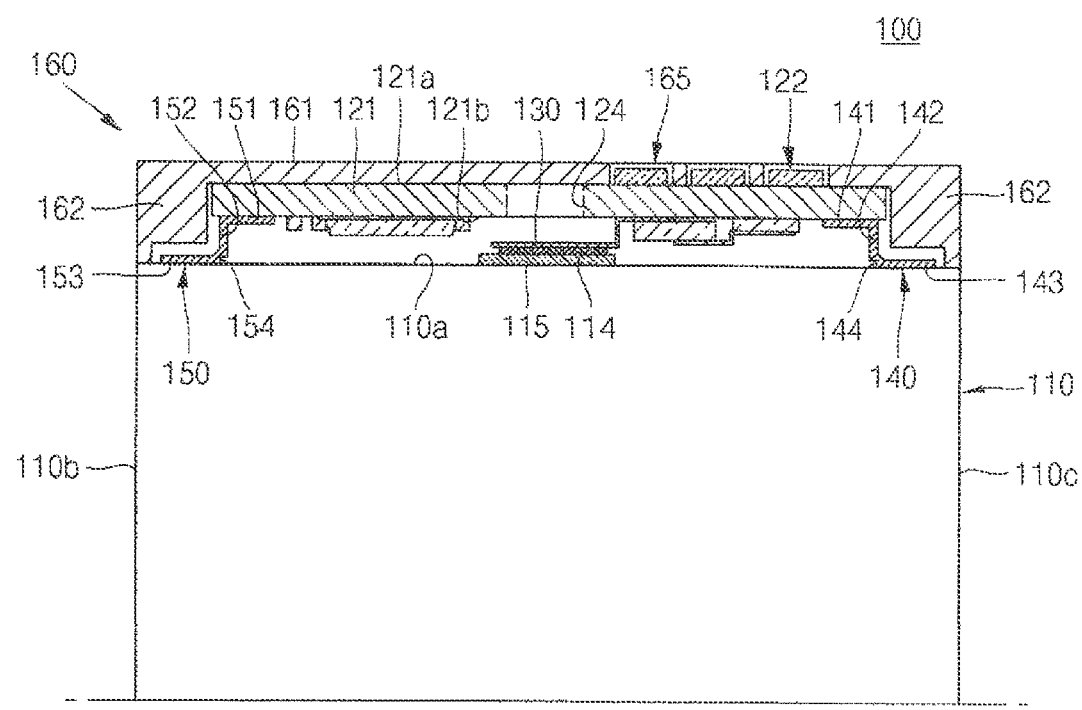
FIG. 1C is a cross-sectional view illustrating a state in which a battery pack taken along sectional line A-A' of FIG. 1A.
Figure 2:
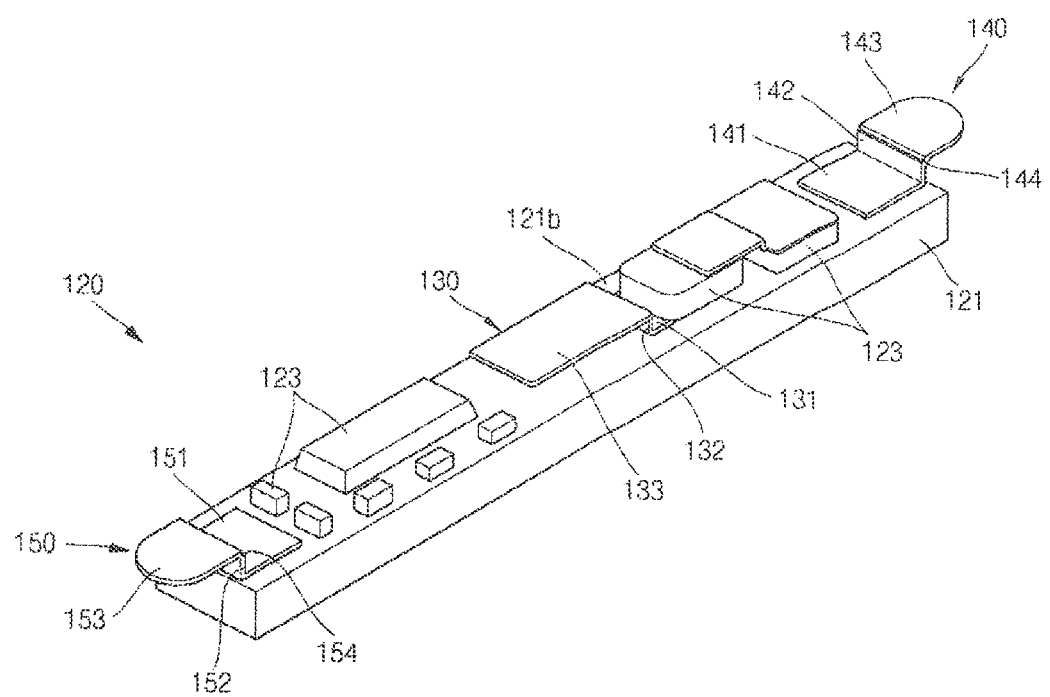
FIG. 2 is an oblique view illustrating a bottom of a circuit module in the battery pack shown in FIG. 1B.
Figure 3:
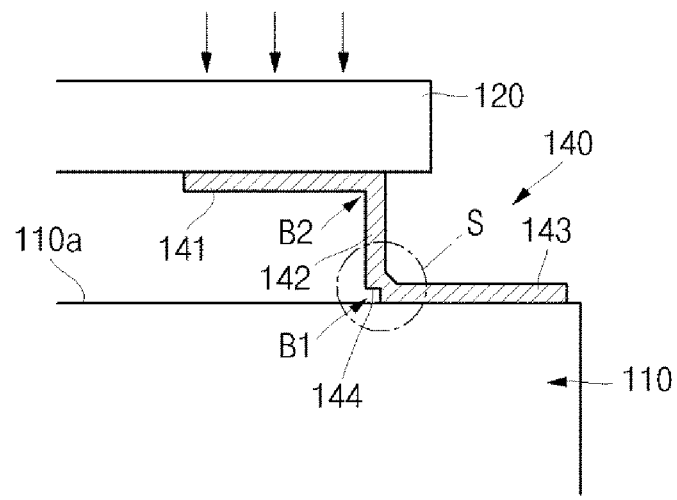
FIG. 3 is an enlarged cross-sectional view partially illustrating a bare cell, a circuit module and a first lead plate in the battery pack shown in FIG. 1C.
Figure 4:
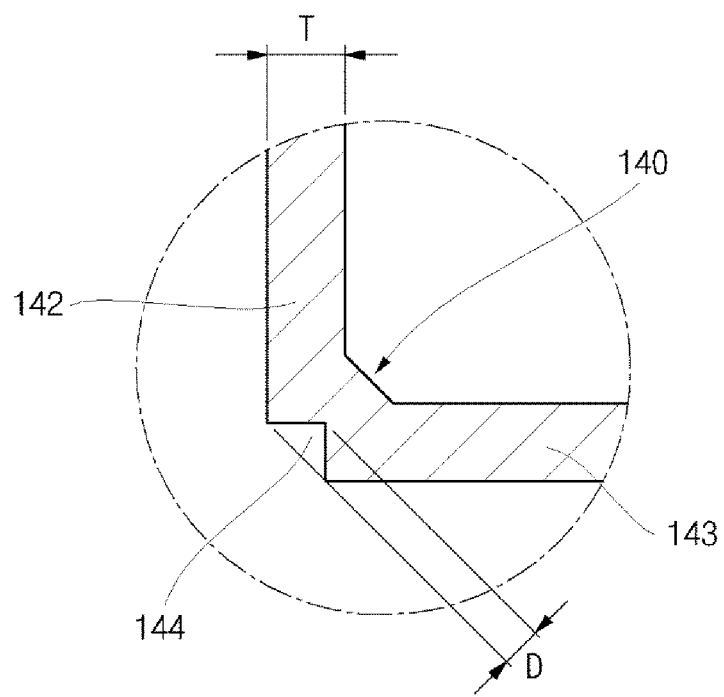
FIG. 4 is a cross-sectional view illustrating a portion 'S' of FIG. 3.

FIG. 1A is an oblique view of a completed battery pack constructed as an embodiment according to the principles of the present invention. FIG. 1B is an exploded oblique view of the battery pack shown in FIG. 1A. FIG. 1C is a cross-sectional view illustrating a state in which a battery pack taken along sectional line A-A' of FIG. 1A. FIG. 2 is an oblique view illustrating a bottom of a circuit module in the battery pack shown in FIG. 1B. FIG. 3 is an enlarged cross-sectional view partially illustrating a bare cell, a circuit module and a first lead plate in the battery pack shown in FIG. 1C. FIG. 4 is a cross-sectional view illustrating a portion 'S' of FIG. 3.

Referring to FIGS. 1A through 4, battery pack 100 constructed as the embodiment according to the principles of the present invention may include a bare cell 110, a circuit module 120, an electrode lead plate 130, a first lead plate 140, a second lead plate 150, an top cover 160, a bottom cover 170, and a label 175.

The bare cell 110 and circuit module 120 are electrically connected to each other through electrode lead plate 130, first lead plate 140, and second lead plate 150, forming a core pack. The core pack is coupled to top cover 160 and bottom cover 170, and is labeled by label 175 to complete battery pack 100.

Bare cell 110 supplies electrical energy and includes an electrode assembly (not shown) having a positive electrode, a negative electrode, and a separator interposed between the positive electrode and the negative electrode, a can 111 shaped of a container to and accommodating the electrode assembly and an electrolyte (not shown), and a cap assembly 112 sealing an opening of can 111. Here, cap assembly 112 includes a cap plate 113 made of a metal, an electrode terminal 114 protruding over cap plate 113, and a gasket 115 interposed between cap plate 113 and electrode terminal 114 to insulate electrode terminal 114 from cap plate 113.

Can 111 and cap plate 113 themselves may function as a terminal, and in the embodiment of the present invention, they are assumed to function as a positive electrode. In this case, electrode terminal 114 is assumed to function as a negative electrode. It is apparent that can 111, cap plate 113, and electrode terminal 114 may have different polarities.

As illustrated in FIG. 1B, the outer appearance of bare cell 110 has a top surface 110a over which electrode terminal 114 protrudes with electrode terminal 114 being insulated by gasket 115, a pair of narrow side surfaces 110b and 110c and a pair of wide side surfaces 110d and 110e connected to top surface 110a, and a bottom surface 110f connected to side surfaces 110b, 110c, 110d, and 110e and being opposite to top surface 110a. Here, narrow side surfaces 110b and 110c are side surfaces whose widths are relatively narrow, and wide side surfaces 110d and 110e are side surfaces whose widths are relatively wide.

Circuit module 120 is disposed on bare cell 110 and electrically connected to bare cell 110, and includes a circuit board 121, external terminals 122, and a welding hole 124.

Circuit board 121 is a plate made of a resin, and includes a protective circuit such as a circuit (not shown) controlling charge and discharge of the battery or a circuit preventing over discharge or overcharge of the battery. Circuit board 121 includes a circuit device 123 for realizing a charge/discharge circuit (not shown) and the protective circuit (not shown) on bottom surface 121b. Meanwhile, it is assumed that top surface 121a of circuit board 121 is the same as the top surface of circuit module 120 and bottom surface 121b of circuit board 121 is the same as the bottom surface of circuit module 120.

External terminals 122 are installed on top surface 121a of circuit board 121, and electrically connect circuit board 121 to an external electronic device (not shown).

Welding hole 124 passes through top surface 121a and bottom surface 121b of circuit board 121. Welding hole 124 is located in a region corresponding to electrode terminal 114 of bare cell 110 to provide a space in which first lead plate 130 to be described later is welded by, for example, resistance welding.

Electrode lead plate 130 is provided at bottom surface 121b of circuit board 121 and is electrically connected to a negative electrode wire pattern (not shown) of circuit module 120. Electrode lead plate 130 is electrically connected to electrode terminal 114 by, for example, resistance welding. Electrode lead plate 130 may be made of a metal such as nickel or a nickel alloy. Here, electrode lead plate 130 is electrically connected to electrode terminal 114 to function as a negative electrode like electrode terminal 114.

More particularly, referring to FIG. 2, electrode lead plate 130 includes an electrode lead bottom wall 131, an electrode lead sidewall 132, and an electrode lead extension 133.

Electrode lead bottom wall 131 may contact a peripheral portion of welding hole 124 in bottom surface 121b of circuit board 121, and may be electrically connected to circuit device 123 disposed in the peripheral portion of welding hole 124. Circuit device 123 may be, for example, a positive temperature coefficient (FTC) device.

Electrode lead sidewall 132 is bent from electrode lead bottom wall 131 and extends toward bare cell 110.

Electrode lead extension 133 is bent and extends from electrode lead sidewall 132 so as to electrically contact electrode terminal 114. Electrode lead extension 133 is parallel with electrode lead bottom wall 131, and is located in a region corresponding to welding hole 124, so that electrode lead extension 133 is practically welded to electrode terminal 114 through welding hole 124 by resistance welding.

First lead plate 140 is coupled to one side of circuit module 120 to be electrically connected to a positive electrode wire pattern (not shown) of circuit module 120. In addition, first lead plate 140 extends so as to be connected to top surface 110a of bare cell 110 to be electrically connected to bare cell 110. Hence, first lead plate 140 serves as an electrode tab that electrically connects bare cell 110 and circuit module 120 to each other. First lead plate 140 may be made of a metal such as nickel or a nickel alloy. Here, first lead plate 140 is connected to top surface 110a (i.e. cap plate 113 functioning as a positive electrode) of bare cell 110 to function as a positive electrode.

First lead plate 140 has at least two bent portions B1 and B2 between circuit module 120 and top surface 110a of bare cell 110, and is formed in a substantially "Z" shape. In detail, referring to FIGS. 1C through 3, first lead plate 140 includes a first lead bottom wall 141, a first lead sidewall 142, a first lead extension 143, and a first notch recess 144.

First lead bottom wall 141 has a plate-like shape and makes contact with one side of bottom surface 121b of circuit board 121 and is electrically connected to circuit module 120 by, for example, laser welding.

First lead sidewall 142 is bent from first lead bottom wall 141 and extends toward top surface 110a of bare cell 110 to secure a gap between circuit module 120 and bare cell 110.

First lead extension 143 is bent and extended from one side of first lead sidewall 142 so as to contact top surface 110a of bare cell 110. First lead extension 143 is parallel to first lead bottom wall 141. First lead extension 143 is electrically connected to top surface 110a of bare cell 110 by, for example, laser welding. Here, the laser welding for electrically connecting top surface 110a of bare cell 110 and first lead extension 143 to each other may be performed in a state in which circuit module 120 and first lead bottom wall 141 are electrically connected to each other. That is to say, the laser welding for electrically connecting top surface 110a of bare cell 110 and first lead extension 143 to each other may be performed by irradiating laser onto first lead extension 143 in a state in which circuit module 120 disposed on top surface 110a of bare cell 110 is pressed by a welding jig (not shown). In FIG. 3, the arrow shown on circuit module 120 indicates a direction in which circuit module 120 is pressed by the welding jig.

First notch recess 144 is formed in bent portion B1 of first lead plate 140. In detail, first notch recess 144 is formed at an edge where first lead sidewall 142 and first lead extension 143 meet. Here, first notch recess 144 faces top surface 110a of bare cell 110. First notch recess 144 reduces a resilient force of first lead plate 140 disposed between circuit module 120 and top surface 110a of bare cell 110 when circuit module 120 is pressed by the welding jig during laser welding for electrically connecting top surface 110a of bare cell 110 and first lead extension 143 to each other. In addition, first notch recess 144 facilitates deformation of first lead sidewall 142, instead of first lead extension 143. Accordingly, first notch recess 144 prevents first lead extension 143 from being lifted off from top surface 110a of bare cell 110, thereby preventing a gap from being generated between first lead extension 143 and top surface 110a of bare cell 110. Thus, first notch recess 144 allows laser to be irradiated into first lead extension 143 in a state in which first lead extension 143 is in close contact with top surface 110a of bare cell 110, thereby improving welding efficiency of first lead plate 140. In addition, in a case where a gap exists between first lead extension 143 and top surface 110a of bare cell 110, first notch recess 144 prevents welding failure of first lead plate 140. The welding failure of first lead plate 140 may be generated when the laser irradiated into first lead extension 143 of a portion where the gap exists is reflected in all directions and travels in an undesired direction, that is, to top surface 110a of bare cell 110. Consequently, the welding failure of first lead plate 140 may cause damages to top surface 110a of bare cell 110, resulting in leakage of an electrolyte, which is, however, avoidable by forming first notch recess 144.

Referring to FIG. 4, first notch recess 144 may be formed to have a depth D within a range of approximately 10% to approximately 50% of a thickness T of first lead plate 140. If depth D of first notch recess 144 is less than 10% of thickness T of first lead plate 140, the effect of preventing first lead extension 143 from being lifted off is negligible. If depth D of first notch recess 144 is greater than 50% of thickness T of first lead plate 140, the resistance of first lead plate 140 against external impacts becomes considerably weak.

Second lead plate 150 is coupled to the opposite side of circuit module 120 to be symmetrical with first lead plate 140, and is electrically connected to the positive electrode wire pattern (not shown) of circuit module 120. In addition, second lead plate 150 is connected to and extends from top surface 110a of bare cell 110 to be electrically connected to bare cell 110. Hence, second lead plate 150 serves as an electrode tab that electrically connects bare cell 110 and circuit module 120 to each other, like first lead plate 140. Second lead plate 150 has the same shape, size, and material as those of first lead plate 140, and includes a second lead bottom wall 151, a second lead sidewall 152, a second lead extension 153, and a second notch recess 154. Referring to FIGS. 1C and 2, since second lead bottom wall 151, second lead sidewall 152, second lead extension 153, and second notch recess 154 of second lead plate 150 correspond to first lead bottom wall 141, first lead sidewall 142, first lead extension 143 and first notch recess 144 of first lead plate 140, a detailed description of second lead plate 150 will be omitted.

Second lead plate 150 maintains the horizontality of circuit module 120 disposed on bare cell 110 together with first lead plate 140. Hence, second lead plate 150 can reduce lowering of the battery quality due to inclination of the circuit module that would be generated if a first lead plate were conventionally formed only on one side of the circuit module and welded to the top surface of the bare cell by laser welding.

Top cover 160 is coupled to the top of bare cell 110 and circuit module 120 is accommodated in an interior space of top cover 160. Top cover 160 includes a cover plate 161, and a side wall 164 extending from cover plate 161 toward circuit module 120.

Cover plate 161 may be formed in substantially the same shape as that of top surface 110a of bare cell 110. The inner surface of cover plate 161 faces and contacts top surface 121a of circuit board 121. Cover plate 161 has a through-hole 165 formed in a region corresponding to external terminal 122. External terminal 122 is exposed to the outside through through-hole 165 to electrically connect battery pack 100 to an external electronic device (not shown).

Side wall 164 has end portions 162 located at opposite lengthwise ends of top cover 160 and a connecting portion 163 connecting end portions 162 to each other. End portions 162 of side wall 164 contact regions corresponding to the narrow side surfaces 110b and 110c in top surface 110a of bare cell 110 and support top cover 160. Connecting portion 163 extends toward circuit module 120 further than end portions 162. A portion of connecting portion 163 that covers the top of wide side surfaces 110d and 110e of bare cell 110 is wrapped by label 175 to be described below.

Bottom cover 170 is coupled to the bottom of bare cell 110. Bottom cover 170 has a bottom plate 171 and extensions 172 extending from bottom plate 171 toward bare cell 110.

Bottom plate 171 has substantially the same shape as that of bottom surface 110f of bare cell 110 and is attached to bottom surface 110f of bare cell 110 by a bonding member 174.

Extensions 172 cover lower portions of wide side surfaces 110d and 110e of bare cell 110. Extensions 172 are wrapped by label 175.

Label 175 wraps side surfaces 110b, 110c, 110d, and 110e of bare cell 110. Label 175 covers a portion of connecting portion 163 of top cover 160 and extensions 172 of bottom cover 170.

As described above, battery pack 100 constructed as the embodiment according to the principles of the present invention includes first lead plate 140 having first notch recess 144 formed therein. Therefore, laser welding can be performed on first lead plate 140 in a state in which first lead plate 140 is in close contact with top surface 110a of bare cell 110.

Therefore, battery pack 100 according to the embodiment of the present invention can improve welding efficiency of first lead plate 140 and prevent leakage of an electrolyte by preventing welding failure of first lead plate 140.

Hereinafter, a battery pack constructed as another embodiment according to the principles of the present invention will be described.

Battery pack 200 constructed as the other embodiment according to the principles of the present invention has substantially the same configuration as battery pack 100 constructed as the previous embodiment of the present invention, except for the configuration of a first lead plate 240. Accordingly, the same elements are denoted by the same reference numerals and the illustration and description of the same elements will be omitted. Hereinafter, only the configurations of first lead plate 240, and a bare cell 110 and a circuit module 120 connected to first lead plate 240 are illustrated in FIG. 5, which will now be mainly described in detail.

Figure 5:
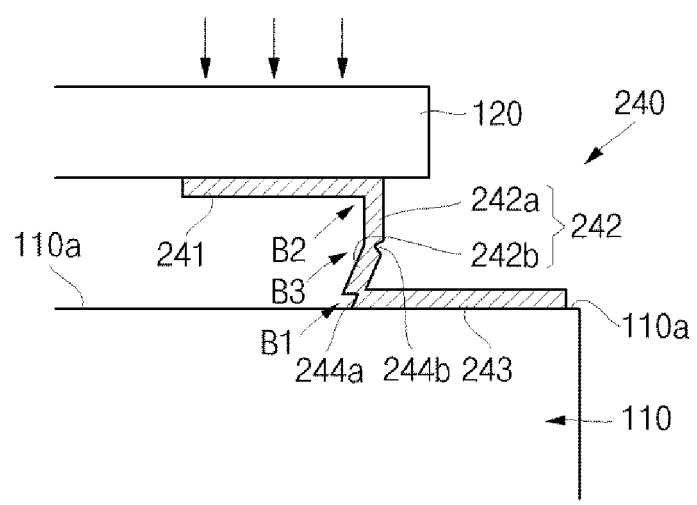
FIG. 5 is an enlarged cross-sectional view partially illustrating a bare cell, a circuit module and a first lead plate in a battery pack constructed as another embodiment according to the principles of the present invention.

FIG. 5 is an enlarged cross-sectional view partially illustrating a bare cell, a circuit module and a first lead plate in a battery pack constructed as the other embodiment according to the principles of the present invention. In FIG. 5, the arrow shown on the circuit module 120 indicates a direction in which circuit module 120 is pressed by a welding jig during laser welding for electrically connecting a top surface 110a of bare cell 110 and a first lead extension 243 to each other.

Referring to FIG. 5, first lead plate 240 is formed in a substantially "Z" shape, like first lead plate 140 shown in FIG. 3. First lead plate 240 is different from first lead plate 140, since first lead plate 240 has more bent portions than first lead plate 140. For example, first lead plate 240 includes an additional bent portion B3. More specifically, first lead plate 240 may include a first lead bottom wall 241, a first lead side wall 242, a first lead extension 243, and notch recesses 244a and 244b.

Since first lead bottom wall 241 is substantially the same as first lead bottom wall 141 shown in FIG. 3, a duplicated description thereof will be omitted.

First lead side wall 242 is substantially the same as first lead side wall 142 shown in FIG. 3, except that first lead side wall 242 includes a first section 242a and a second section 242b. First section 242a is bent and extends from first lead bottom wall 241. Second section 242b is bent and extends from first section 242a to be connected to first lead extension 234. First section 242a and second section 242b increase the number of first bent portions of first lead plate 240.

First lead extension 243 is substantially the same as first lead side wall 143 shown in FIG. 3, except that first lead extension 243 is bent and extends from second section 242b of first lead side wall 242.

Notch recess 244a is formed at bent portion B1 of first lead plate 240. More specifically, notch recess 244a is formed at the edge where second section 242b of first lead side wall 242 and first lead extension 243 meet. Here, notch recess 244a faces top surface 110a of bare cell 110. In addition, notch recess 244b may further be formed at the edge where first section 242a of first lead side wall 242 and second section 242b meet. Here, notch recess 244b faces first lead extension 243. In such a manner, a plurality of notch recesses may be formed. The plurally formed notch recesses 244a and 244b may further reduce a resilient force of first lead plate 240 disposed between circuit module 120 and top surface 110 of bare cell 110 when circuit module 120 is pressed by a welding jig (not shown) during laser welding for electrically connecting top surface 110a of bare cell 110 and first lead extension 243 to each other. In addition, the plurally formed notch recesses 244a and 244b may further facilitate deformation of first lead side wall 242, instead of first lead extension 243.

Accordingly, notch recesses 244a and 244b prevent first lead extension 243 from being lifted off from top surface 110a of bare cell 110. Thus, notch recesses 244a and 244b allow laser to be irradiated into first lead extension 243 in a state in which first lead extension 243 is in close contact with top surface 110a of bare cell 110, thereby further improving welding efficiency of first lead plate 240 and preventing leakage of an electrolyte due to welding failure of first lead plate 240 in a more effective manner. In addition, notch recesses 244a and 244b may be formed to have a depth equal to that of first notch recess 144 shown in FIG. 4.

Meanwhile, a second lead plate (not shown) is coupled to the opposite side of the circuit module (120 of FIG. 1B) to be symmetrical with first lead plate 240, and is electrically connected to the positive electrode wire pattern (not shown) of circuit module 120. In addition, the second lead plate is connected to and extends from top surface 110a of bare cell 110 to be electrically connected to bare cell 110. Since the second lead plate is formed to have the same shape, size and material as first lead plate 240, a detailed description thereof will be omitted.

As described above, since the battery pack constructed as the other embodiment of the present invention includes first lead plate 240 having a plurality of notch recess 244a and 244b, laser welding may be performed on first lead plate 240 in a state where first lead plate 240 is more effectively brought into closer contact with top surface 110a of bare cell 110.

Therefore, the battery pack according to the embodiment of the present invention can further improve the welding efficiency of first lead plate 240 and can prevent leakage of an electrolyte by preventing welding failure of first lead plate 240 in a more effective manner.

While the present invention has been particularly shown and described with reference to preferred embodiments thereof, it will be understood by those of ordinary skill in the art that various changes in form and detail may be made therein without departing from the spirit and scope of the present invention as defined by the appended claims.

What is claimed is:

1. A battery pack, comprising:
a bare cell having an electrode terminal protruding on a surface of the bare cell;
a circuit module disposed on the surface of the bare cell; and
a first lead plate including a lead bottom wall, a lead sidewall, a lead extension, a first bent portion connecting the lead sidewall and the lead extension to each other, and a second bent portion connecting the lead bottom wall and the lead sidewall to each other, the lead bottom wall of the first lead plate coupled to one side of the circuit module, the lead extension of the first lead plate connected to the surface of the bare cell and extending beyond the circuit module in a direction parallel to the surface of the bare cell, and the first bent portion of the first lead plate comprising a first notch recess,
the lead sidewall of the first lead plate comprising a first section connected to the lead bottom wall via the second bent portion, a second section connected to the lead extension via the first bent portion, and a third bent portion connecting the first section and second section of the lead sidewall to each other, and
the first lead plate comprising a second notch recess formed at the third bent portion.

2. The battery pack of claim 1, wherein:
the lead bottom wall of the first lead plate contacts a bottom surface of the circuit module;

the lead sidewall of the first lead plate does not directly contact the circuit module and the bare cell; and the lead extension of the first lead plate contacts the surface of the bare cell, the lead extension of the first lead plate is parallel to the lead bottom wall of the first lead plate, and the first notch recess is formed at the first bent portion of the first lead plate.

3. The battery pack of claim 2, wherein the first notch recess faces the surface of the bare cell.

4. The battery pack of claim 1, wherein the second notch recess faces the lead extension of the first lead plate.

5. The battery pack of claim 1, wherein the first notch recess has a depth within a range of approximately 10% to approximately 50% of a thickness of the first lead plate.

6. The battery pack of claim 1, wherein the first lead plate has a substantially "Z" shape.

7. The battery pack of claim 1, wherein the first lead plate is an electrode tab that electrically connects the bare cell and the circuit module to each other.

8. The battery pack of claim 1, wherein the lead extension is welded to the surface of the bare cell by laser welding.

9. The battery pack of claim 1, wherein the first lead plate is made of a metal.

10. The battery pack of claim 1, wherein the surface of the bare cell is formed of a cap plate made of a metal.

11. The battery pack of claim 1, further comprising a second lead plate coupled to the opposite side of the circuit module and connected to the surface of the bare cell.

12. The battery pack of claim 11, wherein the second lead plate is formed to be symmetrical with the first lead plate with respect to the electrode terminal in view of location and shape.

13. The battery pack of claim 1, further comprising a top cover covering the circuit module.

* * * * *